United States Patent
Bachnak

[19]

[11] Patent Number: 6,148,977
[45] Date of Patent: Nov. 21, 2000

[54] FREE-WHEEL CLUTCH

[75] Inventor: Nouhad Bachnak, Frankfurt, Germany

[73] Assignee: Mannesmann VDO AG, Frankfurt, Germany

[21] Appl. No.: 09/371,870

[22] Filed: Aug. 5, 1999

[30] Foreign Application Priority Data

Aug. 10, 1998 [DE] Germany .............. 198 36 019

[51] Int. Cl.⁷ .............. F16D 41/07; B62D 5/04
[52] U.S. Cl. .............. 192/37; 180/443; 192/43; 192/45.1
[58] Field of Search .............. 192/31, 35, 37, 192/38, 43, 43.1, 44, 45.1, 54.1; 180/443; 60/718

[56] References Cited

U.S. PATENT DOCUMENTS

| | | | |
|---|---|---|---|
| 2,723,531 | 11/1955 | Wosika et al. .............. | 60/718 |
| 3,344,686 | 10/1967 | Baker .............. | 192/35 X |
| 3,599,767 | 8/1971 | Sederquist . | |
| 4,089,395 | 5/1978 | Fogelberg . | |
| 4,693,351 | 9/1987 | Adolfsson .............. | 192/35 X |
| 5,103,950 | 4/1992 | Ito et al. .............. | 192/35 |
| 5,355,981 | 10/1994 | Itoh et al. .............. | 192/35 |
| 5,529,158 | 6/1996 | Itoh et al. .............. | 192/35 |
| 5,743,350 | 4/1998 | Yamawaki et al. .............. | 192/38 X |

FOREIGN PATENT DOCUMENTS

| | | |
|---|---|---|
| 0753682 | 1/1997 | European Pat. Off. . . |
| 1896805 | 7/1964 | Germany . |
| 1193316 | 5/1965 | Germany . |
| 2005894 | 8/1971 | Germany . |
| 3501610 | 7/1985 | Germany . |
| 3830283 | 3/1989 | Germany . |
| 3834198 | 4/1989 | Germany . |

Primary Examiner—Rodney H. Bonck
Attorney, Agent, or Firm—Martin A. Farber

[57] ABSTRACT

Known free-wheel clutches are directionally operated clutches, which permit a shaft (12) and a hub (16) to carry each other along in one relative direction of rotation, for example by means of frictional connection. From time to time it is desired, on the one hand, to permit free-wheeling in both directions and, on the other hand, for example when a secondary drive is engaged, to obtain a frictional connection optionally in one relative direction of rotation. This is achieved in that, in the rest position, the clamping elements (28) have a frictional connection to the hub (16), and, with a contact face (36) interact with a fixed element (18). Only when the hub (16) begins a rotational movement is it possible for the clamping elements (28) to jam in a first locked position or a second locked position which acts in the opposite direction. The free-wheel clutch (10) can be used, for example, for coupling an electric servomotor to a steering column of a motor vehicle.

20 Claims, 8 Drawing Sheets

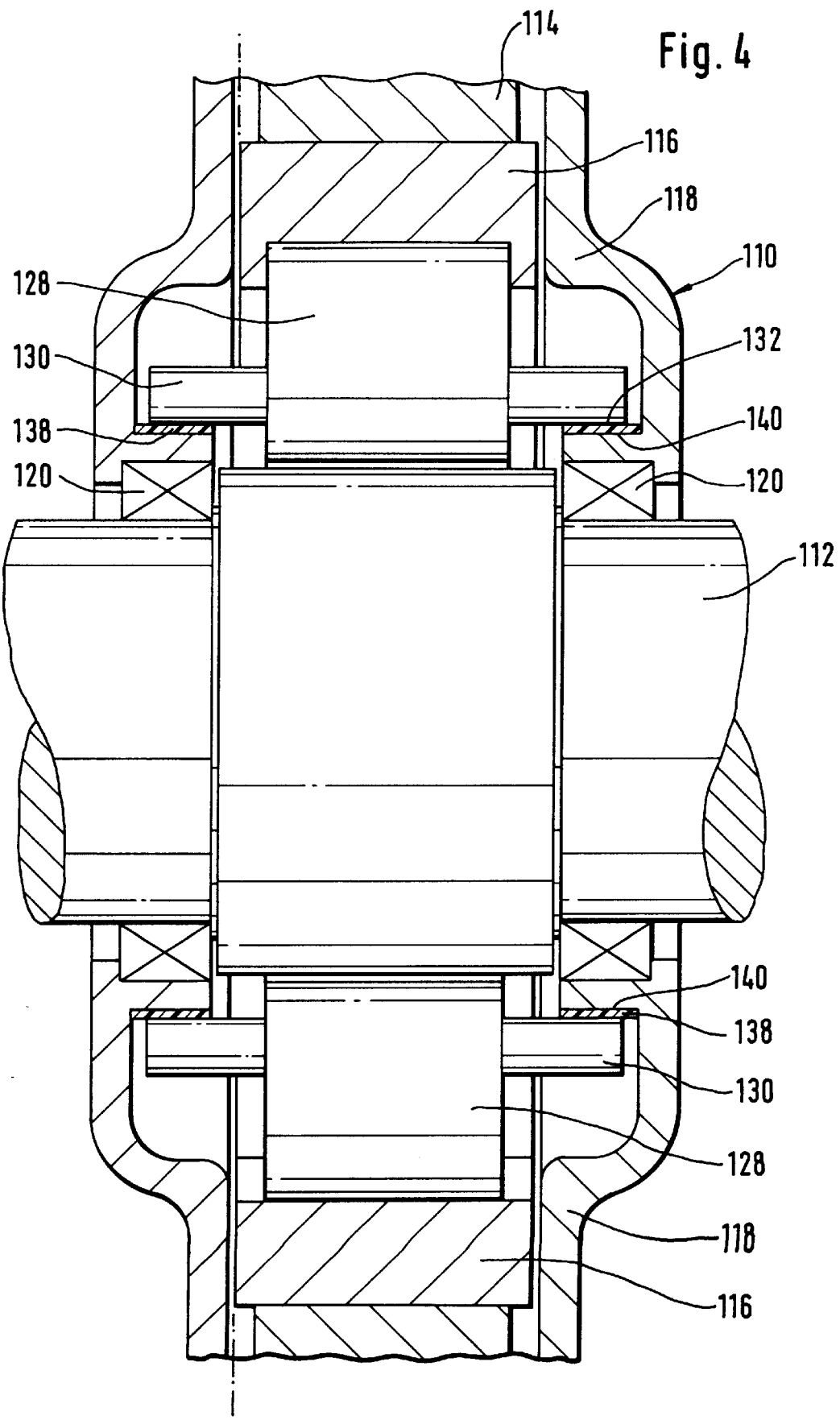

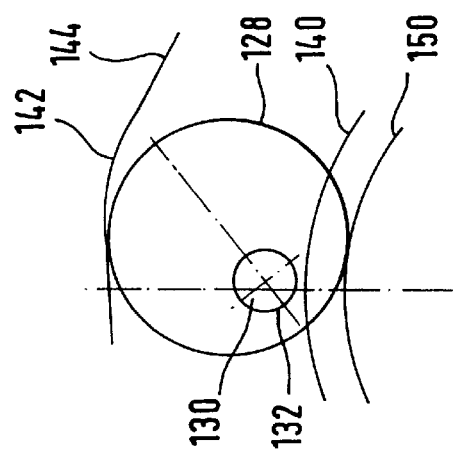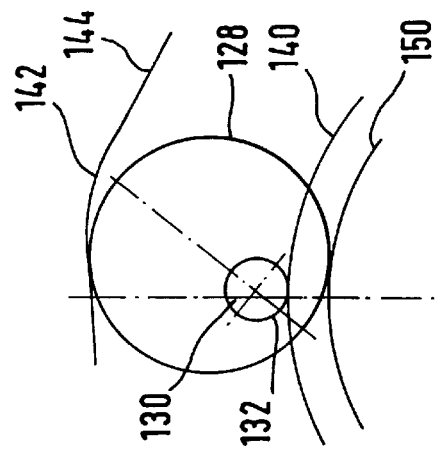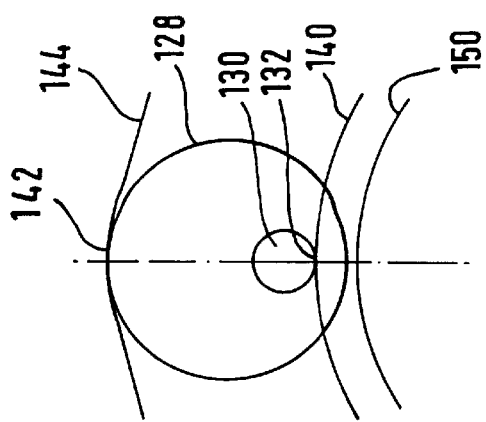

FREE-WHEEL CLUTCH

FIELD AND BACKGROUND OF THE INVENTION

The invention concerns a free-wheel clutch having a shaft, a hub and clamping elements which are arranged between these and can be moved between a rest position, in which the shaft and the hub can be rotated freely with respect to each other, and a locked position, in which said clamping elements produce a frictional connection between shaft and hub in a first relative direction of rotation.

Frictional-connection free-wheel clutches constitute directionally operated clutches which can operate with radial or axial transmission of force. A distinction is drawn between free wheels having cylindrical clamping bodies, which are accommodated between a cylindrical clamping track and one provided with clamping faces and which can be formed on the shaft or the hub, and free wheels having clamping bodies which are arranged between cylindrical clamping tracks and, because of their geometry, can be clamped between these tracks in a specific relative direction of rotation. In order to ensure reliable, immediate driving in the locked direction, free wheels are most often provided with springing for the clamping bodies, which preloads the latter against the frictional face.

Free-wheel clutches of this type are used, inter alia, as roll-back stops, as overrun clutches in two-motor drives and in bicycle hubs.

In some applications, however, it is necessary that the locking action or the free-wheeling action is not exclusively dependent on the direction of rotation, but primarily on which of the parts rotates. Thus, in the case of coupling up an auxiliary drive, for example, it may be desirable for the latter in principle to be completely decoupled from the main drive and for a frictional connection in both directions of rotation to be possible only after said auxiliary drive has been engaged. A return into the free-wheeling position is to occur after the auxiliary drive has been switched off.

Applications of this type may certainly be implemented with the aid of two overrun clutches having opposed free-wheeling or locking directions, which are used alternately depending on the direction of rotation. However, external operation is necessary for this, which requires a high outlay and, for example in the case of directions of rotation which change rapidly and often, makes it necessary to use an electromagnetic clutch, which gives rise to considerable costs, is accompanied by switching noises and has a not inconsiderable energy consumption.

SUMMARY OF THE INVENTION

The object of the invention is to provide a free-wheel clutch which makes the automatic and purely mechanical engagement and disengagement of an auxiliary drive possible in both directions of rotation.

According to the invention, the object is achieved by a free-wheel clutch of the type described at the beginning in which, in the rest position, the clamping elements have a frictional or positively locking connection either to the shaft or the hub and each have a contact face which interacts with a fixed element, so that, as a result of the shaft or the hub rotating in relation to the fixed element, depending on the direction of rotation, the clamping elements move into the first or into a second locked position, in which they produce a frictional connection between shaft and hub in the second relative direction of rotation.

The free-wheel clutch according to the invention allows the shaft or, respectively, the hub to rotate freely in both directions of rotation in the rest position of the clamping elements, without carrying the other element with it. In this respect, it differs from conventional free-wheel clutches, in which, on the contrary, measures are taken to move the clamping elements as quickly and reliably as possible into their locked position in a specific relative direction of rotation.

A further difference between the free-wheel clutch according to the invention and conventional free-wheel clutches is that the clamping elements can move in both directions of motion from their rest position into locked positions which produce a frictional connection in a first or, respectively, the second relative direction of rotation. In principle, the achievement of the locking function can be achieved with the means of known free-wheel clutches, that is to say with a star-shaped clamping face in the case of cylindrical clamping elements or with appropriately shaped clamping elements in the case of cylindrical clamping faces. Because of the rest position of the clamping elements provided between the two locked positions, when the frictional connection is canceled, said clamping elements do not move into the second locked position as a result of an opposite relative rotation between shaft and hub, but into the rest position, in which the frictional connection between shaft and hub is interrupted first and a renewed frictional connection can be achieved only after the element which is in contact with the clamping elements in the rest position has started up again.

This engagement function, which permits a frictional connection of the free-wheel clutch only after this element begins to rotate, is made possible by the fixed element, on which the clamping elements are supported in the rest position.

In the case of the application examples mentioned at the beginning, the free-wheel clutch according to the invention can replace, with the same functional reliability, the otherwise necessary complex arrangements of two free-wheel clutches with additional electromagnetic switching clutches. In this case, for example, the shaft, which can rotate freely in the rest position of the clamping element, is coupled to a main drive, and the hub is coupled to a secondary drive which can be engaged and which, when engaged, overruns the main drive in both directions of rotation, as may be desired in the case of a two-motor drive.

In a further application example, the rotatable shaft is coupled to the steering column of a motor vehicle as the main drive, and the hub is coupled to an electric motor which can be engaged when steering forces or steering torques above a specific level occur in the steering column.

In the case of this use of the free-wheel clutch in an electric-motor steering aid, the advantages by comparison with permanently coupling the electric motor to the steering column are that the driver does not notice the frictional latching torque of the electric motor, which would impair the steering comfort, and the restoring torque of the vehicle wheels is not reduced by the frictional torques caused by the electric motor and its gear mechanism, which under certain circumstances can lead to the steering no longer automatically returning completely into the central position.

In a first variant of the free-wheel clutch according to the invention, provision is made for the clamping elements to be mounted such that they can respectively rotate about a pivot on the hub. The articulation of the clamping elements to the hub, which at the same time constitutes the positively locking connection between clamping elements and hub, ensures a defined displacement of the clamping elements as soon as the hub begins to rotate.

In order to ensure reliable contact between the contact faces of the clamping element and the fixed element, in the rest position, the clamping elements are preferably preloaded radially inward against the fixed element, for example by means of a spring-mounted pivot. In this variant, as long as the hub is stationary, the shaft is able to rotate freely in both directions.

In order to ensure, after the hub has been started up, that the contact between the clamping elements and the fixed element is canceled as soon as possible, and in this way to avoid unnecessary wear to the contact faces, the contact face of the clamping element preferably comprises an outer face on a segment region that extends over a specific angle and interacts with a peripheral face of the fixed element. The frictional connection between clamping element and shaft may be made, for example, by two frictional faces respectively on the outer flanks of associated segment regions, which adjoin the segment region of the contact face on both sides over a specific angle and whose radii are such that, when the clamping elements are pivoted in one direction, a frictional face produces the frictional connection to a cylindrical peripheral face of the shaft in the corresponding relative direction of rotation. As a result of the clamping elements being pivoted, the contact face consequently comes out of the contact region with the peripheral face of the fixed element, and a frictional face comes into contact with the cylindrical peripheral face of the shaft.

In a further preferred embodiment, provision is made for the radii of the frictional faces to increase toward the outer edges of the segment regions. This increase in the radius leads to reliable jamming of the clamping elements and avoids their overrunning or, respectively, slippage between the peripheral face of the shaft and a frictional face of the clamping element.

In order to achieve the reliable, uniform attainment of the locked position of all the clamping elements of the freewheel clutch the contact face is covered by the frictional faces which are arranged offset axially in relation to it and flank it, in each case in a specific angular region. Hence, in a specific transition region, both the contact face and a frictional face are in frictional contact with the respectively associated peripheral faces.

In an alternative embodiment of the free wheel according to the invention, the clamping elements each comprise a rolling body on whose at least one end an eccentric part is fitted which, in the rest position, rests with its face which is on the outside in relation to the rolling-body center on a cylindrical peripheral face of the fixed element.

In this embodiment, the rolling bodies are freely moveable and not articulated to the hub at a specific point. The contact with the fixed element, which is necessary to initiate the locking function, is in this case effected by the eccentric part, so that in the rest position, the rolling body is supported with its outer flank on the hub and with the eccentric parts on the fixed element. In order to assist this support, it may be expedient for the eccentric part to be resiliently preloaded axially outward, in relation to the rolling-body center, against the peripheral face of the fixed element.

Following known free-wheel designs, the locked position is achieved by the rolling bodies being of cylindrical design and being accommodated in a track between a cylindrical peripheral face of the shaft and an essentially cylindrical inner face of the hub, the inner face of the hub having protuberances in the region of the rest positions of the rolling bodies.

In this case, the flanks of the protuberances form the clamping faces for the rolling bodies and permit locked positions in both relative directions of rotation between shaft and hub. The distance between the cylindrical peripheral face of the shaft and the cylindrical inner face of the hub between the protuberances in this case is, of course, smaller than the diameter of the rolling bodies.

In order to achieve an engagement operation of the clutch which is reliable and proceeds smoothly at the same time during the transition into the locked position, the shapes of the protuberances follow the rolling motion, predefined by the external shape of the rolling body and the eccentric part, of the rolling bodies from the rest position on the fixed element. After passing through a transition region, in which both the eccentric part is in contact with the fixed element and the peripheral face of the rolling body is also already in contact with the shaft, the eccentric part lifts off the fixed element, and the rolling bodies jam between shaft and hub.

Instead of the protuberances in the inner face of the hub, the clamping action can also be provided via appropriate shaping of the rolling body which, out of the rest position, can jam between a cylindrical outer and inner track, both of which are cylindrical in this case.

In order to achieve uniform load bearing between shaft and hub, it is preferable for at least three clamping elements to be arranged distributed over the periphery, expediently more in the case of rolling bodies.

In order to achieve an adequate contact pressure of the contact face on the fixed element, instead of or in addition to the abovementioned resilient means, the contact region of the contact face of the clamping element with the fixed element may be of radially resilient design. This may be achieved, for example, by means of a resilient layer on the peripheral face of the fixed element or sprung elements in this region.

In order to ensure that the rest position of the clamping elements is reached, and thus to ensure the complete cancellation of the frictional connection between the clamping elements and the shaft or hub, respectively, it is advantageous to provide spring elements which hold the clamping elements in the rest position. The movement of the clamping elements into the locked position thus takes place counter to the restoring force of the spring elements, which does not impede the engagement operation.

Exemplary embodiments of the invention will be discussed in more detail below using the appended drawings, in which:

BRIEF DESCRIPTION OF THE DRAWINGS

FIG. 4 shows a longitudinal section of a further embodiment of a free-wheel clutch;

FIGS. 6a, 6b and 6c: show a rolling body of the free-wheel clutch according to FIGS. 4 and 5 in the rest position, transition position and locked position;

DETAILED DESCRIPTION OF THE PREFERRED EMBODIMENTS

Figure 1:
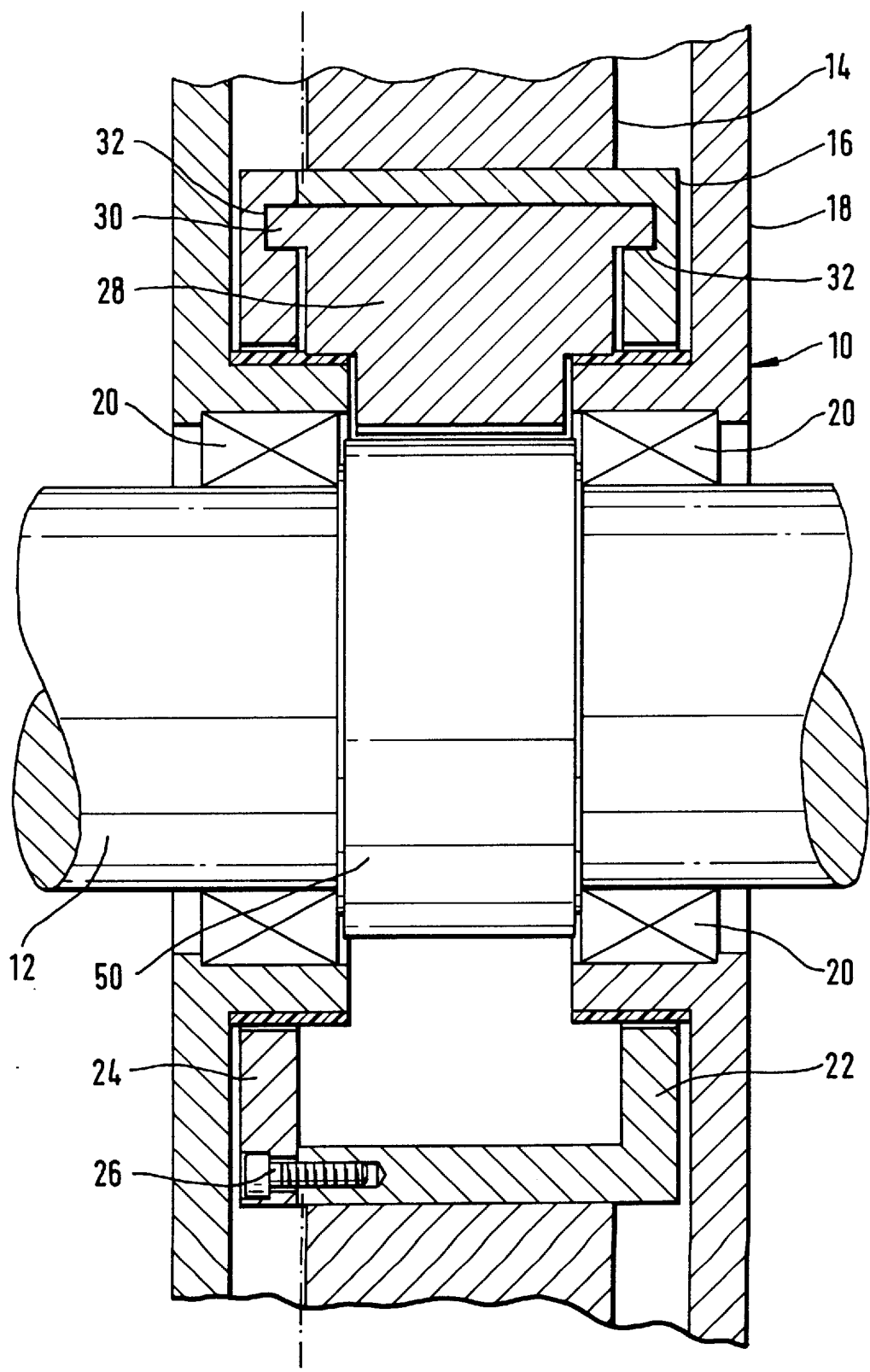
FIG. 1: shows a longitudinal section of a free-wheel clutch.
Figure 2:
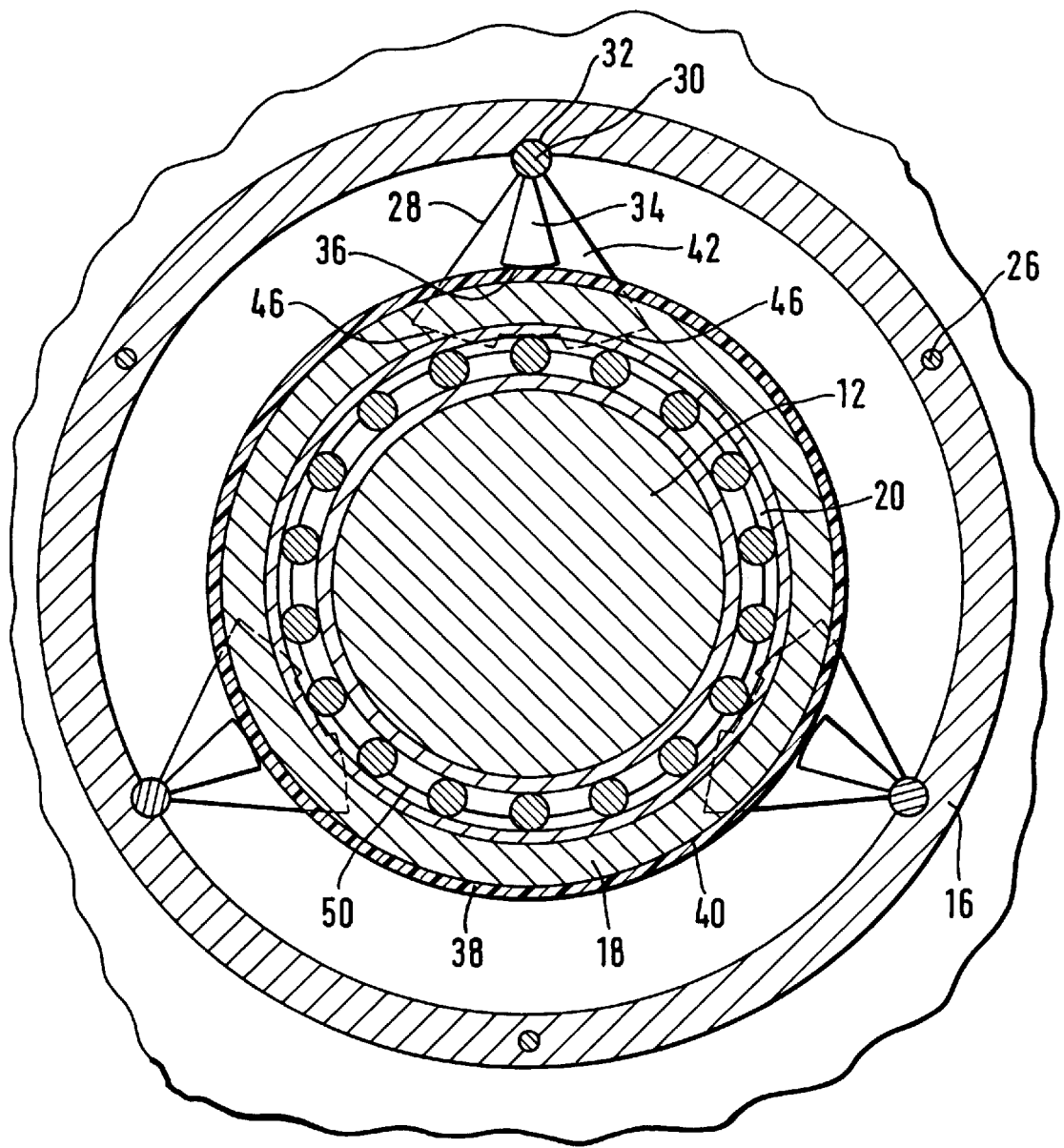
FIG. 2: shows a cross section of the free-wheel clutch according to FIG. 1.

FIGS. 1 and 2 illustrate a free-wheel clutch 10, which is arranged between a shaft 12 and a hub 16 connected to a gear 14. A clutch housing 18 is designed as a fixed part and, for example, fixed to the bodywork of a motor vehicle.

The shaft is mounted, via two ball or cylindrical roller bearings 20, so that it can rotate in the clutch housing 18. Provision is made for the hub 16 to rotate freely with respect to the clutch housing 18, for example by means of bearings (not shown) provided between the hub 16 and the clutch housing 18.

The hub 16 comprises a hub pan 22 and a hub cover 24, which are screwed to each other using fastening screws 26. Accommodated between the hub pan 22 and the hub cover 24 are clamping elements 28, which have pins 30 which are accommodated in appropriate holes 32 in the hub pan 22 and the hub cover 24 and, as a result, effect a pivotable mounting of the clamping elements 28 in the hub 16.

Figure 3C:
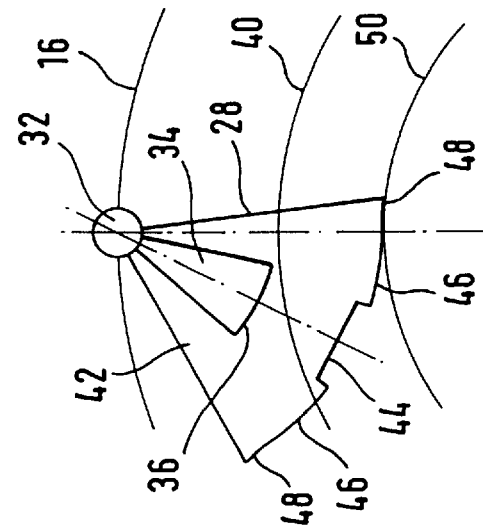
FIGS. 3a, 3b and 3c: show a clamping element of the free-wheel clutch according to FIGS. 1 and 2 in the rest position, transition position and locked position.

The clamping bodies, which are shaped like segments of a disk (see also FIGS. 2 and 3), have a first segment region 34, whose contact face 36 located on the periphery has a pressure contact with a resilient layer 38 which is applied to a peripheral face 40 of the clutch housing 18, in the central position of the clamping elements 28. The clamping elements 28 also have a segment region 42 which extends over a larger angular region and a greater radius than the segment region 34 of the contact face 36. The outer face of the segment region 42 is designed to have a smaller radius over the center of an angular region which is slightly smaller than the angular region of the segment region 34, whereas on either side of this recess 44, frictional faces 46 are provided, whose edge regions 48 are designed to have slightly rising radii. The radius of the frictional faces 46 is selected such that when the clamping element 28 is pivoted out of the rest position, it is possible for a frictional contact to be produced between a frictional face 46 and a cylindrical peripheral face 50 on the shaft 12.

The clamping elements are usually located in a rest position (see FIG. 3a) and, as a result of rotation of the hub 16, move over a transition position (see FIG. 3b) into a locked position (see FIG. 3c), in which they produce a frictional connection between the hub 16 and the shaft 12.

In the initial or rest position (see FIG. 3a), the contact face 36 of the clamping element 28 pivotably mounted in the hub 16 contacts the resilient layer 38 on the fixed clutch housing 18. In spite of this contact, the ability of the clamping elements 28 to pivot permits a relative rotational movement between the hub 16 and the clutch housing 18. In the rest position, there are no points of contact between the hub 16 and the shaft 12, because of the recess 44 provided between the frictional faces 46. In this way, the shaft 12 can be rotated in both directions of rotation without carrying the hub 16 along.

Figure 3B:
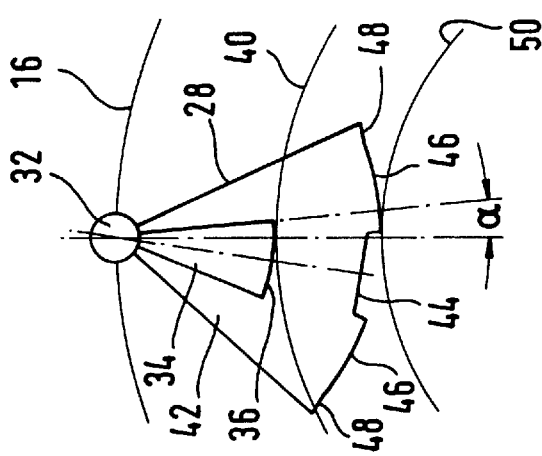
Figure 3A:
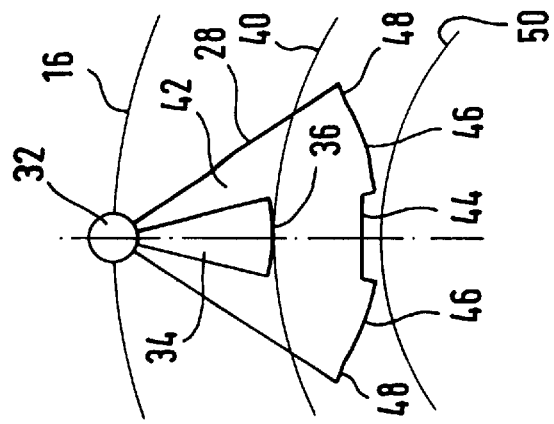

As soon as the hub 16 begins to rotate, the contact face 36 of the clamping element 28 rolls on the peripheral face 40 of the clutch housing 18 and moves into the transition position illustrated in FIG. 3b, in which, depending on the direction of rotation of the hub 16, one of the frictional faces 46 contacts the peripheral face 50 of the shaft 12. Over a specific rotational angle range, the clamping element 28 rolls on the clutch housing 18 and the shaft 12 at the same time. The transition region ensures that all the clamping elements 28 contact the shaft 12, so that uniform and smooth engagement is achieved.

If the hub 16 rotates further, the clamping elements 28 move into the locked position illustrated in FIG. 3c. The contact face 36 has previously been separated from the resilient layer 38, so that there is no longer any frictional connection between hub and clutch housing 18. In the locked position, the clamping element 28 forms a frictional connection between the hub 18 and the shaft 12, the elevated edge regions 48 preventing the clamping elements 28 overrunning and preventing any slippage between the shaft 12 and the frictional face 46 which is engaged. As the hub 16 rotates further, the shaft 12 is carried along with it.

As soon as the rotational speed of the shaft 12 becomes higher than that of the hub 16, a rolling operation of the clamping elements in the opposite direction takes place. As a result, firstly the frictional face 46 forming the frictional connection rolls on the peripheral face 50 of the shaft 12, and subsequently the contact face 36 rolls on the peripheral face 40 of the clutch housing 18, until the clamping elements have reached the rest position shown in FIG. 3a. Spring elements (not shown) are able to assist the restoring movement of the clamping elements 28 in order to disengage the free-wheel clutch 10 reliably.

A further embodiment of a free-wheel clutch 110 is illustrated in FIGS. 4, 5, 6a, 6b and 6c. In this embodiment, too, the free-wheel clutch 110 is arranged between a shaft 112 and a hub 116 which is connected to a gear 114. The shaft 112 is mounted via ball or cylinder roller bearings 120 in a fixed clutch housing 118, which is fixed, for example, to the bodywork of a motor vehicle. In this embodiment, too, provision is made for the hub 116 to rotate freely in relation to the clutch housing 118.

Figure 5:
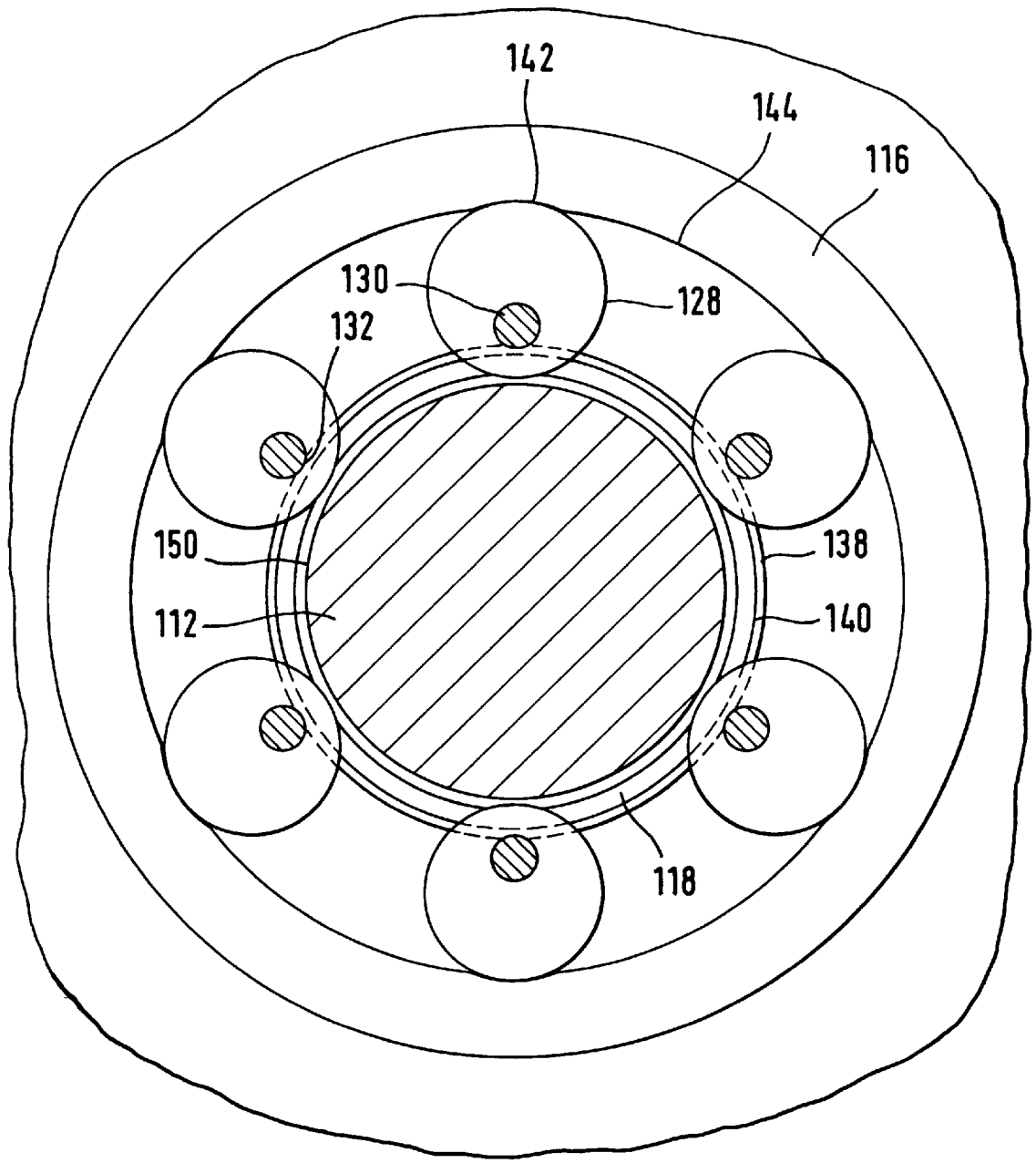
FIG. 5 shows a cross section of the free-wheel clutch according to FIG. 4.

However, in this variant the clamping elements comprise cylindrical rolling bodies 128, on whose ends eccentric parts 130 are formed which have a cylindrical cross section of a smaller diameter. In the rest position, the region 132 of the eccentric part 130 which is radially on the outside in relation to the mid-axis of the rolling body 128 rests with slight pressure on a resilient layer 138 which is applied to a peripheral face 140 on the clutch housing 118. The rest position of the rolling bodies 128 is also illustrated in FIG. 5 and FIG. 6a, the rolling bodies 128 resting in protuberances 142 in an otherwise hollow-cylindrical inner face 144.

The contact between the outer regions 132 of the eccentric parts 130 permits a relative rotational movement of the rolling bodies 128, which are otherwise freely accommodated in the track between a peripheral face 150 on the shaft and the inner face 144 in the hub. In the rest position (see FIG. 6a) there are no points of contact between the hub 116 and the shaft 112, since the distance between the outer region 132 of the eccentric part 130 and the peripheral face of the rolling body 128 is smaller than the difference between the radii of the peripheral face 150 of the shaft 112 and the peripheral face 140 of the clutch housing 118. It is thus possible for the shaft 112 to rotate freely in both directions in the rest position, without carrying the hub 116 with it.

If the hub 116 now begins to rotate, the rolling bodies 128 roll between the points of contact of the eccentric part 130 on the peripheral face 140 of the clutch housing and the points of contact of their actual peripheral face in the protuberance 142. The shape of the protuberance 142 is selected such that the eccentric part 130 initially remains in contact with the resilient layer 138, so that at the same time the [lacuna] located between the peripheral face of the rolling bodies 128 approaches the peripheral face 150 on the shaft 112. In the transition position (see FIG. 6b), the eccentric part 130 is still in contact with the resilient layer 138, and the peripheral face of the rolling body 128 is already resting on the peripheral face 150 on the shaft 112.

During the further rolling motion, which takes place only between the inner face 144 of the hub 16 and the peripheral face 150 of the shaft 112, the rolling bodies 128 move into the locked position illustrated in FIG. 6c, in which the eccentric parts 130 are lifted off the resilient layer 138. The locking action is achieved by the distance between the inner face 144 and the peripheral face 150 being smaller than the diameter of the rolling bodies 128. Consequently, in the locked position the shaft 112 can be carried along by the hub 116.

If the rotational speed of the shaft 112 becomes higher than that of the hub 116, a rolling operation of the rolling bodies 128 in the opposite direction also takes place in this embodiment, until the rolling bodies 128 again assume their rest position according to FIG. 6a via the transition state illustrated in FIG. 6b. In this embodiment, too, spring elements may ensure that the rolling bodies 128 return reliably into their rest position.

Figure 7:
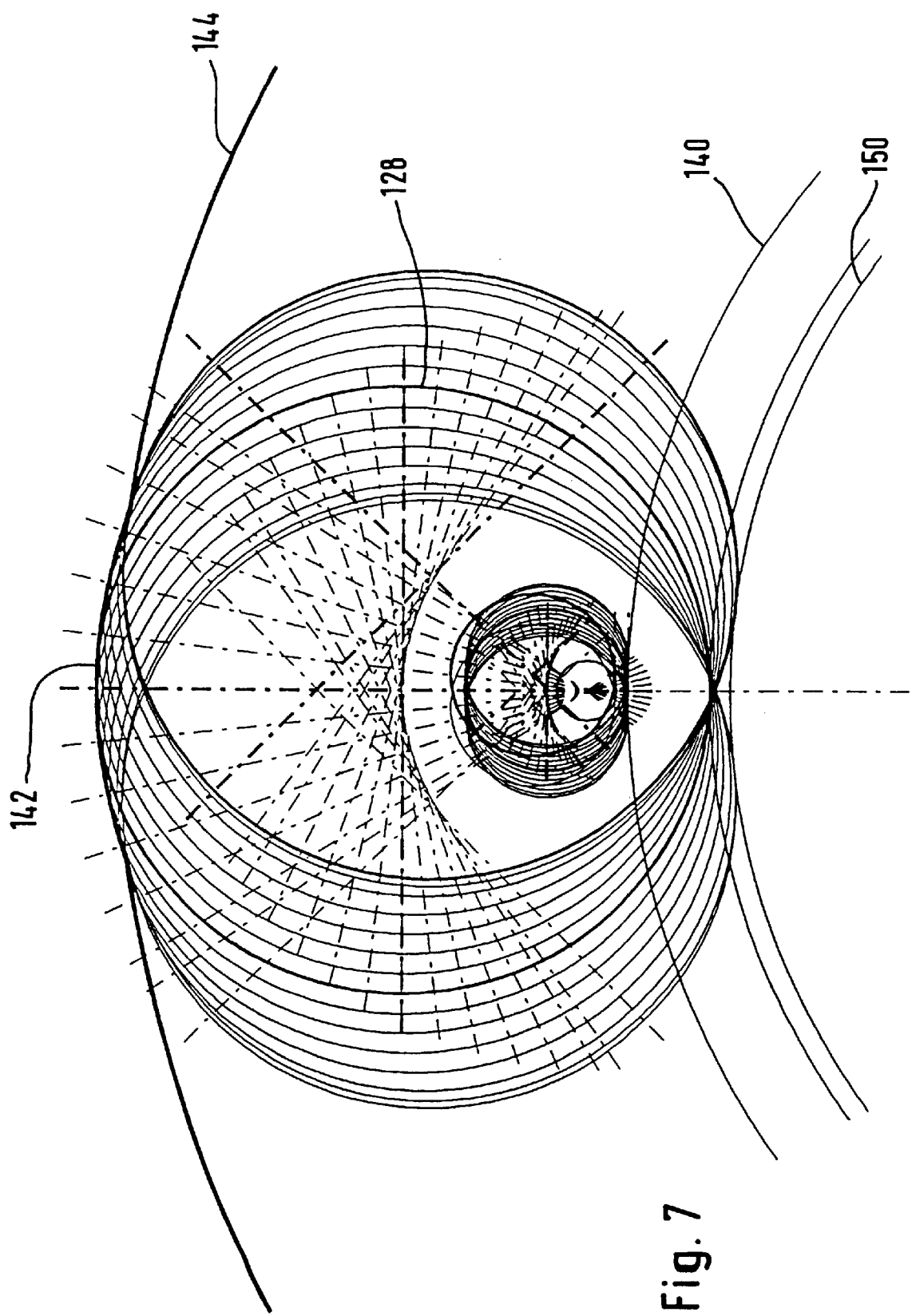
FIG. 7: shows an explanatory illustration of the rolling motion of the rolling bodies.

The rolling motion of the rolling body 128 between the inner face 144, the outer face 140 of the clutch housing 118 and the outer face 150 of the shaft 112 is made clear by the transition positions illustrated in FIG. 7.

Figure 8:
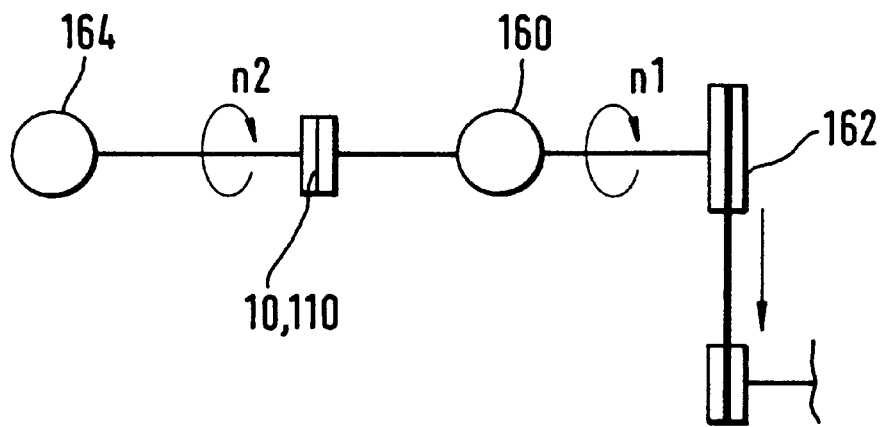
FIG. 8: shows a sketch of the principle of a first application example of a free-wheel clutch.

FIG. 8 illustrates a first application example of a free-wheel clutch 10, 110 in accordance with the functional principle of one of the above-described exemplary embodiments. In this case, a main drive 160 drives, for example, a belt gear mechanism 162 at the rotational speed n1 and, if required, is assisted by an auxiliary drive motor 164, whose nominal rotational speed n2 is greater than n1. As a result, the overrun clutch 10, 110 produces the frictional connection between the auxiliary drive 164 and the main drive 160 when the auxiliary drive 164 is engaged. After the auxiliary drive 164 has been switched off, the clamping elements 28, 128 return into the rest positions and the auxiliary drive 164 is disengaged from the main drive 160, so that the latter does not have to drag the auxiliary drive along in normal operation.

Figure 9:
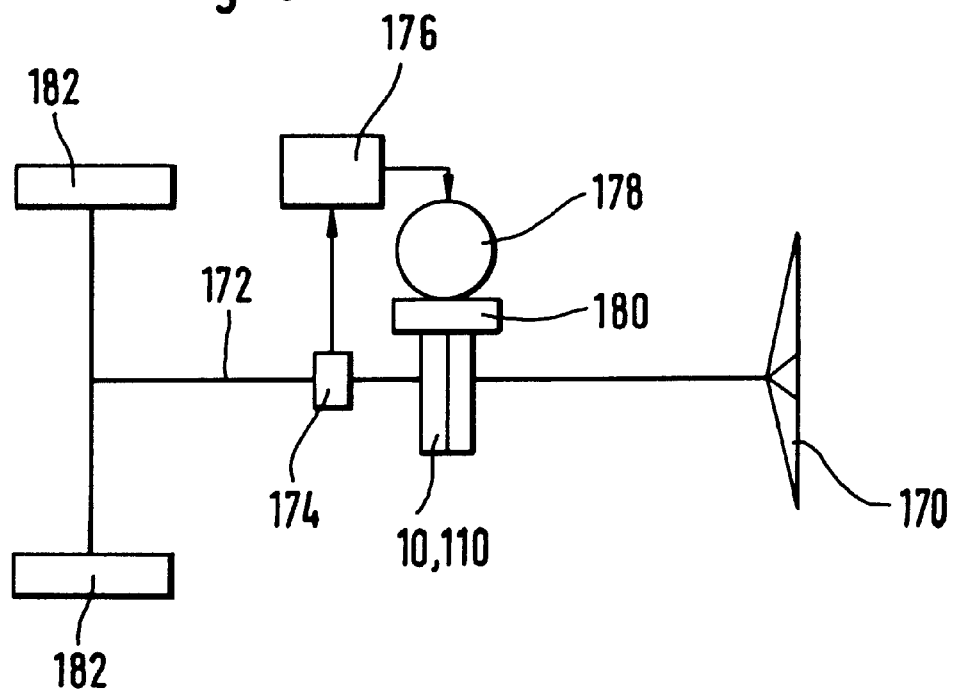
FIG. 9: shows the use of a free-wheel clutch in an electric-motor steering aid.

FIG. 9 illustrates a further application example of the free-wheel clutch 10, 110 in an electric-motor steering aid. In this case, the driver constitutes the main drive by means of the steering forces introduced into the steering wheel 170 and into the steering column 172, which is coupled to the shaft 12, 112 of the free-wheel clutch, the torque introduced by the driver being registered by a torque sensor 174. The level and direction of this torque are forwarded in the form of an electric signal to control electronics 176 which, beginning at a specific threshold value, activate an electric drive motor 178 as a function of the level and direction of the torque and, if appropriate, the speed of the vehicle. The electric motor 178 is coupled to the hub 16, 116 of the free-wheel clutch 10, 110 via a gear mechanism 180, and functions as an auxiliary drive to assist the driver.

At high speed and with small steering movements, the torque introduced by the driver is low, and assistance with the driving movement is not required. The free-wheel position of the free-wheel clutch 10, 110 ensures that the driver does not notice the frictional latching torque of the electric motor, and the restoring torques of the vehicle wheels 182 are not impeded by the frictional torques of the motor 178 and its gear mechanism 180. Thanks to the free-wheel clutch 10, 110, assistance with the steering movement is possible in both directions of rotation of the steering column 172.

What is claimed is:

1. A free-wheel clutch having a shaft (12; 112), a hub (16; 116) and clamping elements (28; 128) which are arranged between these and can be moved between a rest position, in which the shaft (12, 112) and the hub (16, 116) can be rotated freely with respect to each other, and a locked position, in which said clamping elements produce a frictional connection between shaft (12; 112) and hub (16; 116) in a first relative direction of rotation, wherein, in the rest position, the clamping elements (28; 128) have a frictional or positively locking connection either to the shaft (12; 112) or the hub (16; 116) and each has a contact face (36; 132) which interacts with a fixed element (18, 38, 40; 118, 138, 140), so that, as a result of the shaft (12; 112) or the hub (16; 116) rotating in relation to the fixed element (18; 118), depending on the direction of rotation, the clamping elements (28; 128) move into the first or into a second locked position, in which they produce a frictional connection between the shaft (12; 112) and the hub (16; 116) in the second relative direction of rotation; and wherein each of said clamping elements has plural regions of contact with respective parts of said clutch including said hub and said shaft and said fixed element, at least two of said contact regions being surfaces upon which said clamping element rolls upon rotation of said clamping element, one of said contact regions being said contact face, and wherein interfaces between said two contact regions and two corresponding ones of said clutch parts are configured to provide for alternating times of contact of said clamping element with said two clutch parts upon rotation of said clamping element.

2. The free-wheel clutch as claimed in claim 1, wherein the clamping elements (28) are mounted such that they can respectively rotate about a pivot on the hub (16).

3. The free-wheel clutch as claimed in claim 1, wherein at least three clamping elements (28; 118) are arranged distributed over the periphery.

4. The free-wheel clutch as claimed in claim 1, wherein spring elements are provided which hold the clamping elements (28; 128) in the rest position.

5. The free-wheel clutch as claimed in claim 1, wherein the shaft (12; 112), which can rotate freely in the rest position of the clamping elements (28; 128), is coupled to a main drive (160; 172), and the hub (16; 116) is coupled to a secondary drive (164; 174, 180) which can be engaged and which, when engaged, overruns the main drive (160; 172) in both directions of rotation.

6. The free-wheel clutch as claimed in claim 1, wherein the shaft (12; 112), which can rotate freely in the rest position of the clamping elements (28; 128), is coupled to a main drive (160; 172), and the hub (16; 116) is coupled to a secondary drive (164; 174, 180) which can be engaged and which, when engaged, overruns the main drive (160; 172) in both directions of rotation; and the rotatable shaft (12; 112) is coupled to the steering column (172) of a motor vehicle as the main drive, and the hub (16; 116) is coupled to an electric motor (178) which can be engaged when steering forces or steering torques above a specific level occur in the steering column (172).

7. A free-wheel clutch having a shaft (12; 112), a hub (16; 116) and clamping elements (28; 128) which are arranged between these and can be moved between a rest position, in which the shaft (12, 112) and the hub (16, 116) can be rotated freely with respect to each other, and a locked position, in which said clamping elements produce a frictional connection between shaft (12; 112) and hub (16; 116) in a first relative direction of rotation, wherein, in the rest position, the clamping elements (28; 128) have a frictional or positively locking connection either to the shaft (12; 112) or the hub (16; 116) and each has a contact face (36; 132) which interacts with a fixed element (18, 38, 40; 118, 138, 140), so that, as a result of the shaft (12; 112) or the hub (16; 116) rotating in relation to the fixed element (18; 118), depending on the direction of rotation, the clamping elements (28; 128) move into the first or into a second locked position, in which they produce a frictional connection between the shaft (12; 112) and the hub (16; 116) in the second relative direction of rotation;

wherein the clamping elements (28) are mounted such that they can respectively rotate about a pivot on the hub (16); and in the rest position, the clamping elements (28) are resiliently preloaded radially inward against the fixed element (18, 38).

8. A free-wheel clutch having a shaft (12; 112), a hub (16; 116) and clamping elements (28; 128) which are arranged between these and can be moved between a rest position, in which the shaft (12, 112) and the hub (16, 116) can be rotated freely with respect to each other, and a locked position, in which said clamping elements produce a frictional connection between shaft (12; 112) and hub (16; 116) in a first relative direction of rotation, wherein, in the rest position, the clamping elements (28; 128) have a frictional or positively locking connection either to the shaft (12; 112) or the hub (16; 116) and each has a contact face (36; 132) which interacts with a fixed element (18, 38, 40; 118, 138, 140), so that, as a result of the shaft (12; 112) or the hub (16; 116) rotating in relation to the fixed element (18; 118), depending on the direction of rotation, the clamping elements (28; 128) move into the first or into a second locked position, in which they produce a frictional connection between the shaft (12; 112) and the hub (16; 116) in the second relative direction of rotation;

wherein the clamping elements (28) are mounted such that they can respectively rotate about a pivot on the hub (16); and the contact faces (36) of the clamping elements (28) comprise an outer face on a segment region (34) that extends over a specific angle, and interact with a peripheral face (38, 40) of the fixed element (18).

9. A free-wheel clutch having a shaft (12; 112), a hub (16; 116) and clamping elements (28; 128) which are arranged between these and can be moved between a rest position, in which the shaft (12, 112) and the hub (16, 116) can be rotated freely with respect to each other, and a locked position, in which said clamping elements produce a frictional connection between shaft (12; 112) and hub (16; 116) in a first relative direction of rotation, wherein, in the rest position, the clamping elements (28; 128) have a frictional or positively locking connection either to the shaft (12; 112) or the hub (16; 116) and each has a contact face (36; 132) which interacts with a fixed element (18, 38, 40; 118, 138, 140), so that, as a result of the shaft (12; 112) or the hub (16; 116) rotating in relation to the fixed element (18, 118), depending on the direction of rotation, the clamping elements (28; 128) move into the first or into a second locked position, in which they produce a frictional connection between the shaft (12; 112) and the hub (16; 116) in the second relative direction of rotation;

wherein the clamping elements (28) each have two frictional faces (46) on the outer faces of associated segment regions (42), which adjoin a segment region (34) of the contact face (36) on both sides over a specific angle and whose radii are such that, when the clamping element (28) is pivoted in one direction, a frictional face (46) produces the frictional connection to a cylindrical peripheral face (50) of the shaft (12) in the corresponding relative direction of rotation.

10. The free-wheel clutch as claimed in claim 9, wherein the radii of the frictional faces (46) increase toward the outer edges (48) of the segment regions (42).

11. The free-wheel clutch as claimed in claim 9, wherein the contact face is covered by the frictional faces (46) which are arranged offset axially in relation to it and flank it, in each case in a specific angular region.

12. The free-wheel clutch as claimed in claim 9, wherein the distance between the contact face (36) and the pivot is smaller than the distance between the frictional faces (46) and the pivot.

13. A free-wheel clutch having a shaft (12; 112), a hub (16; 116) and clamping elements (28; 128) which are arranged between these and can be moved between a rest position, in which the shaft (12, 112) and the hub (16, 116) can be rotated freely with respect to each other, and a locked position, in which said clamping elements produce a frictional connection between shaft (12; 112) and hub (16; 116) in a first relative direction of rotation, wherein, in the rest position, the clamping elements (28; 128) have a frictional or positively locking connection either to the shaft (12; 112) or the hub (16; 116) and each has a contact face (36; 132) which interacts with a fixed element (18, 38, 40; 118, 138, 140), so that, as a result of the shaft (12; 112) or the hub (16; 116) rotating in relation to the fixed element (18; 118), depending on the direction of rotation, the clamping elements (28; 128) move into the first or into a second locked position, in which they produce a frictional connection between the shaft (12; 112) and the hub (16; 116) in the second relative direction of rotation;

wherein the clamping elements each comprises a rolling body (128) on whose at least one end wall an eccentric part (130) is formed which, in the rest position, rests with its face (132) which is on the outside in relation to the rolling-body center on a cylindrical peripheral face (138, 140) of the fixed element (118).

14. The free-wheel clutch as claimed in claim 13, wherein the eccentric part (130) is resiliently preloaded radially outward, in relation to the rolling-body center, against the peripheral face (138, 140).

15. The free-wheel clutch as claimed in claim 13, wherein the rolling bodies (128) are of cylindrical design and are accommodated in a track between a cylindrical peripheral face (150) of the shaft (112) and an essentially cylindrical inner face (144) of the hub (116), the inner face (144) of the hub (116) having protuberances (142) in the region of the rest positions of the rolling bodies (128).

16. The free-wheel clutch as claimed in claim 15, wherein the shape of the protuberances (142) follows the rolling motion, predefined by the external shape of the rolling body (128) and eccentric part (130), of the rolling bodies (128) from the rest position on the fixed element (118).

17. A free-wheel clutch having a shaft (12; 112), a hub (16; 116) and clamping elements (28; 128) which are arranged between these and can be moved between a rest position, in which the shaft (12, 112) and the hub (16, 116) can be rotated freely with respect to each other, and a locked position, in which said clamping elements produce a frictional connection between shaft (12; 112) and hub (16; 116) in a first relative direction of rotation, wherein, in the rest position, the clamping elements (28; 128) have a frictional or positively locking connection either to the shaft (12; 112) or the hub (16; 116) and each has a contact face (36; 132) which interacts with a fixed element (18, 38, 40; 118, 138, 140), so that, as a result of the shaft (12; 112) or the hub (16; 116) rotating in relation to the fixed element (18; 118), depending on the direction of rotation, the clamping elements (28; 128) move into the first or into a second locked position, in which they produce a frictional connection between the shaft (12; 112) and the hub (16; 116) in the second relative direction of rotation; and a contact region of the contact faces (36; 132) of the clamping elements (28; 128) and the fixed element (118) is of radially resilient design.

18. The free-wheel clutch as claimed in claim 17, wherein the fixed element (18; 118) is designed with a resilient layer (38; 138) or sprung elements in the contact region.

19. A free-wheel clutch having a shaft (12; 112), a hub 116; 116) and clamping elements (28; 128) which are arranged between these and can be moved between a rest position, in which the shaft (12, 112) and the hub (16, 116) can be rotated freely with respect to each other, and a locked position, in which said clamping elements produce a frictional connection between shaft (12; 112) and hub (16; 116) in a first relative direction of rotation, wherein, in the rest position, the clamping elements (28; 128) have a frictional or positively locking connection either to the shaft (12; 112) or the hub (16; 116) and each has a contact face (36; 132) which interacts with a fixed element (18, 38, 40; 118, 138, 140), so that, as a result of the shaft (12; 112) or the hub (16; 116) rotating in relation to the fixed element (18; 118), depending on the direction of rotation, the clamping elements (28; 128) move into the first or into a second locked position, in which they produce a frictional connection between the shaft (12; 112) and the hub (16; 116) in the second relative direction of rotation;

wherein the shaft (12; 112), which can rotate freely in the rest position of the clamping elements (28; 128), is coupled to a main drive (160; 172), and the hub (16; 116) is coupled to a secondary drive (164; 174, 180) which can be engaged and which, when engaged, overruns the main drive (160; 172) in both directions of rotation: and the rotatable shaft (12; 112) is coupled to the steering column (172) of a motor vehicle as the main drive, and the hub (16; 116) is coupled to an electric motor (178) which can be engaged when steering forces or steering torques above a specific level occur in the steering column (172).

20. A free-wheel clutch having a shaft (12: 112), a hub (16; 116) and clamping elements (28; 128) which are arranged between these and can be moved between a rest position, in which the shaft (12, 112) and the hub (16, 116) can be rotated freely with respect to each other, and a locked position, in which said clamping elements produce a frictional connection between shaft (12; 112) and hub (16; 116) in a first relative direction of rotation, wherein, in the rest position, the clamping elements (28; 128) have a frictional or positively locking connection either to the shaft (12; 112) or the hub (16; 116) and each has a contact face (36; 132) which interacts with a fixed element (18, 38, 40; 118, 138, 140), so that, as a result of the shaft (12; 112) or the hub (16; 116) rotating in relation to the fixed element (18; 118), depending on the direction of rotation, the clamping elements (28; 128) move into the first or into a second locked position, in which they produce a frictional connection between the shaft (12; 112) and the hub (16; 116) in the second relative direction of rotation;

wherein, in the rest position, the clamping elements (28) are resiliently preloaded radially inward against the fixed element (18, 38);

the shaft (12; 112), which can rotate freely in the rest position of the clamping elements (28; 128), is coupled to a main drive (160; 172), and the hub (16; 116) is coupled to a secondary drive (164; 174, 180) which can be engaged and which, when engaged, overruns the main drive (160; 172) in both directions of rotation; and the rotatable shaft (12; 112) is coupled to the steering column (172) of a motor vehicle as the main drive, and the hub (16; 116) is coupled to an electric motor (178) which can be engaged when steering forces or steering torques above a specific level occur in the steering column (172).

* * * * *